United States Patent
Kreuder et al.

[11] Patent Number: 6,114,490
[45] Date of Patent: Sep. 5, 2000

[54] POLYMERS COMPRISING OLIG-P-PHENYLENE UNITS, A PROCESS FOR THEIR PREPARATION AND THEIR USE

[75] Inventors: Willi Kreuder; Dieter Neher; Marcus Remmers, all of Mainz, Germany

[73] Assignee: Hoechst Aktiengesellschaft, Frankfurt, Germany

[21] Appl. No.: 08/913,653

[22] PCT Filed: Mar. 13, 1996

[86] PCT No.: PCT/EP96/01066

§ 371 Date: Sep. 18, 1997

§ 102(e) Date: Sep. 18, 1997

[87] PCT Pub. No.: WO96/29356

PCT Pub. Date: Sep. 26, 1996

[30] Foreign Application Priority Data

Mar. 20, 1995 [DE] Germany ............................ 195 09 451

[51] Int. Cl.[7] .............................. C08G 8/02; C08G 61/00; C08G 65/38

[52] U.S. Cl. ............................ 528/86; 528/125; 528/212; 528/218; 528/219; 528/220; 528/225; 528/370; 528/394

[58] Field of Search .............................. 528/86, 125, 370, 528/394, 212, 218, 219, 220, 225

[56] References Cited

U.S. PATENT DOCUMENTS

| | | |
|---|---|---|
| 4,837,096 | 6/1989 | Kimura et al. . |
| 5,401,827 | 3/1995 | Holmes et al. .......................... 528/373 |
| 5,512,654 | 4/1996 | Holmes et al. .......................... 528/373 |

FOREIGN PATENT DOCUMENTS

| | | |
|---|---|---|
| WO 92/03490 | 3/1992 | WIPO . |
| WO 94/29883 | 12/1994 | WIPO . |
| WO 96/10598 | 4/1996 | WIPO . |

OTHER PUBLICATIONS

Hörhold et al., Faserforschung u. Textiltechn, Bd. 25, 1974, S 108. Month of Publication Not Available.
Feast et al., Synthetic Metals, Bd. 10, 1985, S 181. Month of Publication Not Available.
Hörhold et al., Plaste & Kaut, Bd. 17, Nr. 2 1970, S. 84 ff and related English language abstract. Month of Publication Not Available.
Hörhold et al., Acta Polym. Bd. 30, No. 2, 1970, S 84 ff and related English language abstract. Month of Publication Not Available.
Droske et al., Macromolecules, Bd. 20, Nr. 2, 1987, S 462 ff and English language abstract. Month of Publication Not Available.
Mahrt et al., Synth. Met., Bd. 45, Nr. 1, 1991, S. 107 ff and related English language abstract.Month of Publication Not Available.
Greiner et al., Polymer, Bd. 32, Nr. 10, 1991, S. 1857 ff and related English language abstract. Month of Publication Not Available.
Brown et al., Macromolecules, Bd. 21, Nr. 6, S. 1859 ff and related English language abstract. The Publication Date Not Available.
Bochmann et al., J. Polym. Schi., Part A, Bd. 30, Nr. 12, S. 2503 ff and related English language abstract. The Publication Date Not Available.
Obtemperanskaya et al., J. Anal. Chem., Bd. 50, Nr. 4, S. 394 ff and related English language abstract. The Publication Date Not Available.
Wu et al., Polym. Mater. Sci. Engl., Bd. 60, 1989, S. 762 ff and related English language abstract. Month of Publication Not Available.
Trumbo et al., J. Polym. Sci. Part A, Bd. 25, Nr. 3, 1987, S. 839 ff and related English language abstract. Month of Publication Not Available.
Research Disclosure, Nr. 332, 1991, S. 971. Month of Publication Not Available.
Mallon et al., Polym. Prepr., Bd. 30, Nr. 2, 1989, S. 503 and related English language abstract. Month of Publication Not Available.

(List continued on next page.)

*Primary Examiner*—P. Hampton-Hightower
*Attorney, Agent, or Firm*—Frommer Lawrence & Haug LLP

[57] ABSTRACT

A novel polymer comprising oligo-p-phenylene units and having formula $(A_kB)_n$ is disclosed, wherein A and B have the following chemical structure:

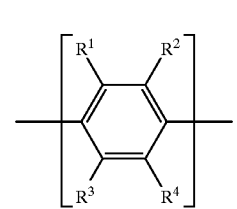

A

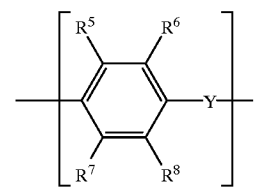

B

Y are identical or different and are each (E)—$CR^9=CR^{10}$—, —C≡C— or —$CHR^{11}$—$CHR^{12}$;
$R^1$, $R^2$, $R^3$, $R^4$, $R^5$, $R^6$, $R^7$, $R^8$, $R^9$, $R^{10}$, $R^{11}$, $R^{12}$ are, independently of one another, identical or different in the individual structural elements and are each H, a straight-chain or branched alkyl group having from 1 to 22 carbon atoms, or an aryl or aryloxy group, or Br, Cl, F, CN or alkyloxycarbonyl having from 2 to 23 carbon atoms;
k is from 1 to 25,
n is from 1 to 200.

The polymer of the present invention may be used as an electroluminescence material.

19 Claims, No Drawings

OTHER PUBLICATIONS

Kantor et al. Macromolecules, Bd. 25, Nr. 11, 1992, S. 2789 ff and related English language abstract. Month of Publication Not Available.

Fujita et al., J. Polym. Sci., Polym. Chem. Ed., Bd. 19, Nr. 5, 1981, S. 1273 ff and related English language abstract. Month of Publication Not Available.

Utley et al., J. Mater. Chem., Bd. 5, Nr. 9, 1995, S. 1297 and related English language abstract. Month of Publication Not Available.

S.W. Kantor, Macromolecules, Bd. 26, Nr. 15, 1993, S. 3758 ff. Month of Publication Not Available.

Remmers et al., Macromolecules, Bd. 29, S. 7432 ff. The Publication Date Not Available.

Musfeldt et al., J. of Polym. Sci: part B: Polymer physics, Bd. 32, 1994, S 2395 ff. Month of Publication Not Available.

Meyers et al., J. Chem. Phys. Bd. 97, Nr. 4, 1992, S. 2750 ff. Month of Publication Not Available.

Homes et al., Synthetic Metals, Bd. 55–57, 1993, S. 4031 ff. Month of Publication Not Available.

D.D.C. Bradley, J. Phys. D: Appl. Phys., Bd. 20, 1987, S. 1389. Month of Publication Not Available.

POLYMERS COMPRISING OLIG-P-PHENYLENE UNITS, A PROCESS FOR THEIR PREPARATION AND THEIR USE

RELATED APPLICATIONS

This application is a §371 of PCT/EP96/01066, filed Mar. 13, 1996, based on Fed. Rep. Germany Application No. 195 09 451.4, filed Mar. 20, 1995.

There is a great industrial need for large-area solid-state light sources for a range of applications, predominantly in the field of display elements, VDU technology and light engineering. The demands made of these light sources can at present not be met completely satisfactorily by any of the existing technologies.

As an alternative to conventional display and/or lighting elements such as incandescent lamps, gas discharge lamps and non-self-illuminating liquid crystal display elements, use has for some time been made of electroluminescence (EL) materials and devices such as light-emitting diodes (LEDs).

Apart from inorganic electroluminescence materials and devices, low molecular weight, organic electroluminescence materials and devices have been known for about 30 years (see, for example, U.S. Pat. No. 3,172,862). However, until recently such devices have been greatly restricted in their practical usability.

WO 90/13148 and EP-A 0 443 861 describe electroluminescence devices comprising a film of a conjugated polymer as light-emitting layer (semiconductor layer). Such devices offer numerous advantageous such as the opportunity to produce large-area, flexible displays simply and inexpensively. In contrast to liquid crystal displays, electroluminescent displays are self-illuminating and therefore require no additional backward lighting source.

A typical electroluminescence device as described in WO 90/13148 comprises a light-emitting layer in the form of a thin, coherent polymer film (semiconductor layer) comprising at least one conjugated polymer. A first contact layer is in contact with a first surface of the semiconductor layer and a second contact layer is in contact with a further surface of the semiconductor layer. The polymer film of the semiconductor layer has a sufficiently low concentration of extrinsic charge carriers for charge carriers to be introduced into the semiconductor layer on application of an electric field between the two contact layers, so that one contact layer becomes positive compared with the other and the semiconductor layer emits radiation. The polymers used in such devices are conjugated. For the purposes of the present invention, a conjugated polymer is a polymer which has a delocalized electron system along the main chain. The delocalized electron system gives the polymer semiconductor properties and enables it to transport positive and/or negative charge carriers with high mobility.

WO 90/13148 describes poly(p-phenylene-vinylene) as polymer material for the light-emitting layer, and it is proposed that the phenyl group in such a material be replaced by a heterocyclic or condensed, carbocyclic ring system. In addition, poly(p-phenylene), PPP, is also used as electroluminescent material (G. Grem, G. Ledetzky, B. Ullrich, G. Leising, Synth. Met. 1992, 51, 383) The main problem in the synthesis and processing of PPP is that this material is insoluble and infusible even at very low degrees of polymerization. Using precursor routes (see, for example, D. G. H. Ballard et al., J. Chem. Soc. Chem. Com. 1983, 954), it has been possible to synthesize relatively high molecular weight PPP and process it at the stage of a prepolymer. However, these materials display incomplete aromatization and/or ortho-linkages and also other structural defects. In order to increase the processability of the PPP and to make possible the synthesis of material having a higher degree of polymerization, derivatives having alkyl or alkoxy side chains and an increased solubility have already been prepared (F. L. Klavetter, G. G. Gustavson, A. J. Heeger, PMSE-Meeting Chicago 1993, 69, 153).

GB-A-1 092 824 describes poly(p-biphenylene-vinylene) which can be prepared by dehydrohalogenation of dihalop-xylene derivatives or by the Wittig reaction (H. H. Horhold, J. Opfermann, Faserforschung und Textiltechnik 1974, 25, 108). However, the first method does not achieve complete elimination. Furthermore, in both syntheses the content of double bonds having a cis configuration is sometimes considerable. In addition, poly(p-biphenylene-vinylene) is insoluble in all known solvents. It can only be obtained as a precipitate from solution and further processing is only possible by means of, for example, sintering techniques. Production of homogeneous, thin polymer films is thus not possible.

An increase in the solubility of poly(p-biphenylene-vinylene) is achieved by introducing methyl substituents in the 2 and 2' positions of the biphenylene unit (A. Greiner, H. Martelock, A. Noll, N. Siegfried, W. Heitz, Polymer 1991, 32, 1857), but this results in considerable twisting of the two phenyl units, which causes both an unfavorable shift in the maximum of the electroluminescence emission and also decreases the quantum yield of the electroluminescence by reducing the conjugation.

The strong blue shift of the UV absorption maximum in the perchlorinated form of poly(p-biphenylene-vinylene) (P. Fors, L. Juliá, J. Riera, J. M. Tura, J. Sauló, J. Polym. Sci., Part A: Polym. Chem. 1992, 30, 2489) shows that the four very bulky chlorine substituents in all 2 positions of the phenyl-phenyl bond cause the same problems. Furthermore, polychlorinated biphenyls are very toxic and ecologically harmful.

Although good results are achieved with some of these materials, the color purity, for example, is still unsatisfactory. Furthermore, it is virtually impossible to generate a blue or white emission using the polymers known hitherto.

The substitution on the double bond of a poly(4,4'-biphenylene-vinylene) has owing to the preparative difficulties, hitherto only been carried out in the form of two phenyl substituents (W. J. Feast et al., Synthetic Metals 1985, 10, 181). However, the substances prepared using this synthesis do not have very high molecular weights and a high proportion, which could not be determined more precisely, of cis double bonds in the polymer chain was found.

Since, in addition, the development of electroluminescence materials, particularly those based on polymers, can in no way be regarded as concluded, the manufacturers of lighting and/or display devices are interested in a wide variety of electroluminescence materials for such devices.

By means of model calculations, theoretical predictions have been made as to how the energy levels of the HOMO and the LUMO in copolymers of pure poly(p-phenylene) and polyacetylene are influenced by the ratio of the monomers (F. Meyers, A. J. Heeger, J. L. Brédas, J. Chem. Phys. 1992, 97, 2750). However, this has not yet been able to be verified experimentally.

It is an object of the present invention to provide novel electroluminescence materials which are soluble in organic solvents and, when used in lighting and/or display devices, are able to improve the property profile of these devices.

It has surprisingly been found that particular derivatives of poly[(oligo-p-phenylene)-vinylene] have an improved solubility in organic solvents and are well suited to the generation of blue, blue-green, green and white electroluminescence.

The invention accordingly provides a polymer which comprises oligo-p-phenylene units and comprises at least one structural element of the formula $(A_kB)_n$, where the symbols and indices have the following meanings:

A are identical or different units

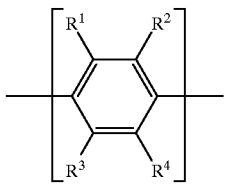

B are identical or different units

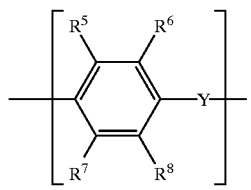

Y are identical or different and are each (E)—$CR^9=CR^{10}$—, —C≡C— or —$CHR^{11}$—$CHR^{12}$;

$R^1$, $R^2$, $R^3$, $R^4$, $R^5$, $R^6$, $R^7$, $R^8$, $R^9$, $R^{10}$, $R^{11}$, $R^{12}$ are, independently of one another, identical or different in the individual structural elements and are each H, a straight-chain or branched alkyl group having from 1 to 22 carbon atoms, where one or more non-adjacent $CH_2$ groups may also be replaced by —O—, —S—, —$SO_2$—, —COOC—, —OOC— and/or phenylene, preferably 1,4-phenylene, or an aryl or aryloxy group, preferably having from 4 to 14 carbon atoms, where the aromatic unit in these groups may be substituted by $C_1$–$C_{22}$-alkyl, $C_1$–$C_{22}$-alkoxy, Br, Cl, F and/or CN, or Br, Cl, F, CN or alkyloxycarbonyl having from 2 to 23 carbon atoms;

k is from 1 to 25;

n is from 1 to 200;

where the sum of all n is in the range from 3 to 200, with the proviso that when k=1, $R^1$, $R^4$, $R^5$ and $R^8$ are identical or different and are each a straight-chain or branched alkyl group having from 2 to 22, preferably from 3 to 12, carbon atoms, where one or more non-adjacent $CH_2$ groups may also be replaced by —O—, —S—, —$SO_2$—, —CO—O—, —O—CO— and/or phenylene, or an aryl group or an aryloxy group, where the aryl radical may in each case be substituted by $C_1$–$C_{22}$-alkyl, $C_1$–$C_{22}$-alkoxy, Br, F, Cl, —CN and/or $NO_2$.

Y is preferably —C≡C— or —$CR^9=CR^{10}$—, particularly preferably —$CR^9=CR^{10}$—.

Preference is given to structures of the formulae (A) and (B) in which $R^2$, $R^3$, $R^6$, $R^7$, $R^9$ and $R^{10}$ are hydrogen.

$R^1$, $R^4$, $R^5$ and $R^8$ are preferably identical or different, straight-chain or branched alkyl or alkoxy groups having from 1 to 22 carbon atoms.

Also preferred are polymers described by the formulae (A) and (B) in which $R^1=R^4$ and $R^5=R^8$.

Particular preference is given to polymers described by the formulae (A) and (B) in which $R^2$, $R^3$, $R^6$, $R^7$, $R^9$ and $R^{10}$ are hydrogen and in which $R^1=R^4$ and $R^5=R^8$ and are each a straight-chain or branched alkoxy group having from 4 to 7 carbon atoms.

The index k is preferably a natural number in the range from 1 to 13, particularly preferably 1, 2 or 3, very particularly preferably 2 or 3.

Preferably, a polymer according to the invention consists of structural elements of the formula $(A_kB)_n$.

In this case, the polymer chain preferably contains only one type of structural element of the formula $(A_kB)$ having a particular value of k. The index n is then preferably in the range from 5 to 75.

Likewise preferably, the polymers of the invention can have a plurality of different structural elements of the formula $(A_kB)$. It should be noted here that the structural element A can be varied not only by means of the radicals $R^1$ to $R^4$, but also by means of the index k.

In such cases, preference is given to random copolymers as are represented by the formula $[(A^1_kB^1)_{0.x}(A^2_kB^2)_{0.y} \ldots (A^n_kB^n)_{0.n}]_m$ where $0.x+0.y \ldots +0.n=1$ and $3 \leq m \leq 200$. Such random copolymers preferably comprise from 2 to 8 different structural elements of the formula $(A_kB)$.

Likewise preferred are block copolymers of the formula $[(A^1_kB^1)_x(A^2_kB^2)_y — \ldots (A^n_kB^n)_n]_m$, where $3 \leq m \leq 200$. Preference is given here to block copolymers comprising two different structural elements of the formula $(A_kB)$. x and y are preferably in the range from 1 to 199, particularly preferably from 2 to 50, where $x+y \leq 200$.

In the presence of a plurality of different structural elements of the formula $(A_kB)_n$, each individual element can have a value of n in the range from 1 to 200, with the proviso that the sum of all n is in the range from 3 to 200, preferably in the range from 5 to 75.

Advantages of the polymers of the invention are, inter alia, the low tendency to crystallize and the good film-forming properties.

Furthermore, the polymers of the invention have an appreciable increase in solubility in organic solvents. They are also structurally uniform, not additionally sterically hindered despite the solubilizing side groups and have a high molecular weight.

The polymers of the invention can be prepared by various methods. The preparation can be carried out by methods known per se from the literature, as are described in standard works on organic synthesis, e.g. Houben-Weyl, Methoden der Organischen Chemie, Georg-Thieme-Verlag, Stuttgart.

The preparation is carried out here under reaction conditions which are known and suitable for the reactions mentioned. Use can also be made of variants which are known per se and are not mentioned in more detail here.

For example, derivatives of benzene and of stilbene can be polymerized oxidatively (e.g. using $FeCl_3$, see, inter alia, P. Kovacic, N. B. Jones, Chem. Ber. 1987, 87, 357; M. Wede, T. Abe, H. Awano, Macromolecules 1992, 25, 5125) or electrochemically (see, for example, N. Saito, T. Yamamoto, Polym. Bull. 1993, 30, 285).

Likewise, the polymers of the invention can be synthesized from dihaloaromatics using copper/triphenylphosphine catalysis (see, for example, G. W. Ebert, R. D. Rieke, J. Org. Chem. 1988, 53, 4482) or nickel/triphenylphosphine catalysis (see, for example, Matsumoto, S. Inaba, R. D. Rieke, J. Org. Chem. 1993, 48, 849).

Aromatic distannanes can be polymerized using palladium catalysis, as indicated, for example, in J. K. Stille, Angew. Chem., Int. Ed. Engl. 1986, 25, 508.

Furthermore, aromatic dibromo compounds can be converted into the dilithio or di-Grignard compounds which are then polymerized with a further dibromo compound by means of CuCl$_2$ (see, for example, G. Wittig, G. Klar, Liebigs Ann. Chem. 1967, 704, 91; H. A. Staab, F. Bunny, Chem. Ber. 1967, 100, 293; T. Kaufmann, Angew. Chem. 1974, 86, 321) or by electron transfer of unsaturated 1,4-dihalo compounds (see, for example, S. K. Taylor, S. G. Bennet, K. J. Harz, L. K. Lashley, J. Org. Chem. 1981, 46, 2190).

In addition, the polymers of the invention can be polymerized by the reaction of the dibromo compounds mentioned with nickel catalysts in the presence of 2,2'-bipyridines (see K. Chmil, U. Scherf, Makromol. Chem., Rapid Commun. 1993, 14, 217).

Likewise, it is possible to build up the polymers of the invention by formation of a double bond. This can be achieved by elimination of oxygen from dialdehydes (W. J. Feast, I. S. Millichamp, Polymer Comm. 1983, 24, 102), dehydrohalogenation of dihalo-p-xylene derivatives (GB-A-1 092 824), by reaction of ethylene with the appropriate dibromides in the presence of palladium catalysts (A. Greiner, H. Martelock, A. Noll, N. Siegfried, W. Heitz, Polymer 1991, 32, 1857), or a Wittig reaction (H.-H. H örhold, J. Opfermann, Faserforschung und Textiltechnik 1974, 25, 108). However, in all these methods varying amounts of by-products are formed and the content of trans double bonds in the polymer is not always 100%.

However, preference is given to a process for preparing the polymers of the invention which comprises reacting one or more compounds of the formula (I)

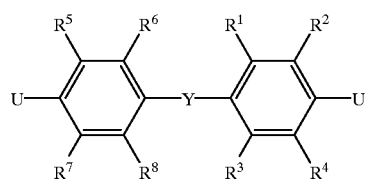

(I)

with one or more compounds of the formula (II) and/or (III)

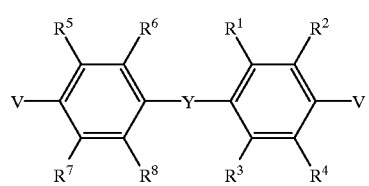

(II)

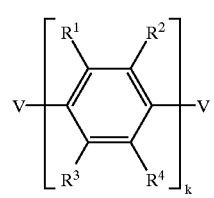

(III)

in an inert organic solvent or solvent mixture in the presence of at least one palladium-containing compound and, if desired, an additional substance, where the symbols and indices in the formulae (I) to (III) have the following meanings:

U and V are different from one another and are each a halogen selected from the group consisting of I, Br and Cl, preferably Br, or BQ$_1$Q$_2$;

Q$_1$, Q$_2$ are identical or different and are —OH, C$_1$–C$_{10}$-alkoxy, C$_1$–C$_{10}$-alkyl, phenyl which may be substituted by C$_1$–C$_{10}$-alkyl, C$_1$–C$_{10}$-alkoxy or halogen; or halogen or Q$_1$ and Q$_2$ together form a C$_1$–C$_4$-alkylenedioxy group, a methylene group which may be substituted by one or two C$_1$–C$_4$-alkyl groups, or Q$_1$ and Q$_2$ and the boron atom are together part of a boroxane ring of the formula (IV)

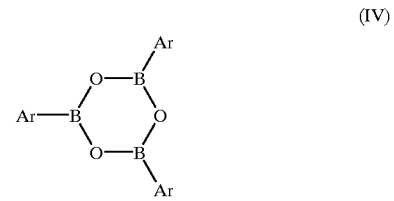

(IV)

Ar is an aromatic radical of the formula (I), (II) or (III);
Y are identical or different and are each (E)—CR$^9$=CR$^{10}$—, —C≡C— or —CHR$^{11}$—CHR$^{12}$;
R$^1$, R$^2$, R$^3$, R$^4$, R$^5$, R$^6$, R$^7$, R$^8$, R$^9$, R$^{10}$, R$^{11}$, R$^{12}$ are, independently of one another, identical or different in the individual structural elements and are each H, a straight-chain or branched alkyl group having from 1 to 22 carbon atoms, where one or more non-adjacent CH$_2$ groups may also be replaced by —O—, —S—, —SO$_2$—, —COOC—, —OOC— and/or phenylene, preferably 1,4-phenylene, or an aryl or aryloxy group, preferably having from 4 to 14 carbon atoms, where the aromatic unit in these groups may be substituted by C$_1$–C$_{22}$-alkyl, C$_1$–C$_{22}$-alkoxy, Br, Cl, F, CN and/or NO$_2$, or Br, Cl, F, CN, NO$_2$ or alkyloxycarbonyl having from 2 to 23 carbon atoms;
k is from 1 to 25, preferably from 1 to 13, particularly preferably 1, 2 or 3, in particular 2 or 3.

It is advantageous to react approximately equimolar amounts of the boronic acid (ester) and the halogen compound. Preference is given to using the boronic acid (ester) in a 1.001- to 1.1-fold excess, particularly preferably a 1.025-fold excess.

The reaction is generally carried out at a temperature in the range from 0 to 150° C., preferably from 20 to 100° C. and particularly preferably from 70 to 90° C. The reaction time is generally from one hour to usually 3 to 5 days.

Preferred solvents are mixtures whose components are miscible or immiscible, preferably immiscible, under the reaction conditions. For the first component, preference is given to a polar protic solvent such as water. As a further component, preference is given to N,N-dialkylamides such as dimethylformamide (DMF), N-methyl-2-pyrrolidone, ethers such as tetrahydrofuran (THF), aromatic hydrocarbons such as toluene and mixtures of the solvents mentioned. Particular preference is given to a binary mixture of THF and water, in particular in a ratio of 1:1.

Compounds containing palladium display catalytic activity for the polymerization reaction. Preference is given to compounds which contain palladium in the oxidation state 0 or form palladium(0) species under the reaction conditions; particular preference is given to tetrakis (triphenylphosphine)palladium(0) which can be used directly. In general use is made of a concentration of 1 mol % catalyst per mole of monomers used. As additional substance, use is generally made of weak bases, preferably sodium hydrogen carbonate in a concentration of 1 mol/l based on the amount of water used.

To prepare random copolymers, it is possible, for example to copolymerize different compounds of the formulae (I) and (II) or (I) and (III) or (I) and (II) and (III).

Various bromo derivatives (U or V is Br) can also be coupled to form random copolymers, e.g. as indicated above using Ni° catalysis.

To prepare block copolymers, the procedure is, for example, to react a halogen component with a sufficiently large excess of a boronic acid (ester) component so as to form oligomers having a defined length and having terminal boronic acid (ester) groups. A second block is produced by reacting a boronic acid (ester) component with an appropriate excess of a halogen component; the oligomers of this second block have terminal halogen functions. Alternatively, such terminated oligomers can also be built up by boration of bromine-terminated oligomers. Reaction of the two blocks in a ratio of 1:1 leads to block copolymers according to the invention.

Incorporation of monomer units of the formula (V),

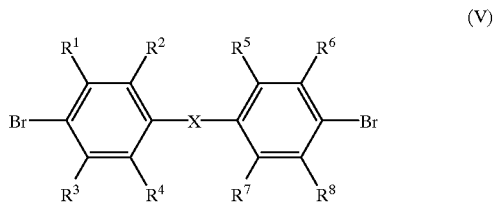

(V)

where the substituents $R^1$ to $R^8$ are as defined above and X is a saturated hydrocarbon chain $-(CH_2)_n-$ where n=1–10 and where one or more non-adjacent $CH_2$ groups may also be replaced by $-O-$, $-S-$, $-SO_2-$, $-COO-$, $-OOC-$ and/or phenyl, makes it possible to interrupt the conjugation in a defined manner within the polymer backbone. Such places suppress the possible diffusion of the excited molecular states and increase the quantum yield of the corresponding electroluminescence device.

It has hitherto been possible to introduce such interruptions of the conjugation only in undefined amounts and spacings (A. B. Holmes et al., Synth. Metals 1993, 55, 4031).

A further possible way of interrupting the conjugation along the main polymer chain comprises the defined use of monomers having a 1,3-dibromo substitution. The resulting polymer has a corresponding kink which effectively suppresses the conjugation.

This monomer is used in place of the corresponding dibromostilbene monomer in such a way that the approximately equimolar ratio of dibromo compounds to diboronic acid is not changed.

In addition, for example, use of monomer building blocks of the formula (VI)

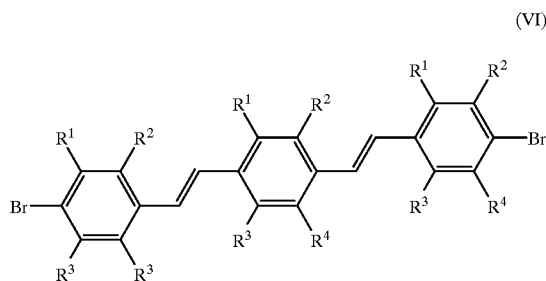

(VI)

where the substituents $R^1$ to $R^4$ are as defined above, makes it possible to incorporate individual p-phenylene-vinylene units.

The invention therefore also provides polymers which comprise not only at least one structural element of the formula $(A_kB)_n$ but also one or more structural elements of the formula (VII) and/or (VIII),

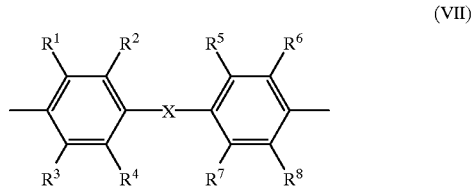

(VII)

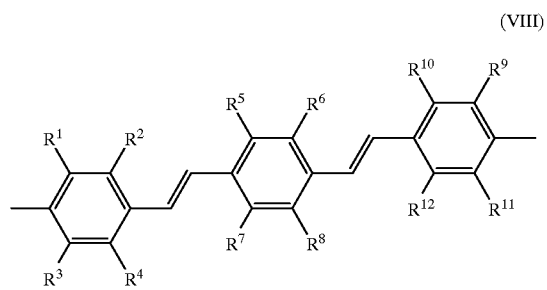

(VIII)

where the symbols $R^1$ to $R^{12}$ and X are as defined above.

The work-up is carried out by the known methods with which those skilled in the art are familiar. For example, the reaction mixture can be poured into methanol, filtered, washed with water, extracted and the crude product obtained can be further purified by reprecipitation.

The monomer building blocks of the formulae (I) to (III) can be prepared by literature methods known per se, as are described in standard works on organic synthesis, e.g. Houben-Weyl, Methoden der Organischen Chemie, Georg-Thieme-Verlag, Stuttgart. The preparation is carried out under reaction conditions which are known and suitable for the reactions mentioned. Use can also be made of variants which are known per se and are not described in more detail here.

Methods of synthesizing substituted 1,4-dibromobenzenes or further 1,4-dihalo compounds are known as standard reactions (see, for example, J. March, Advanced Organic Chemistry, 4th edition, pp. 531–534, John Wiley & Sons, New York 1992).

1,4-Dibromoalkylbenzenes can be prepared, for example, by alkylation of 1,4-dihalobenzenes by a Grignard reaction and subsequent regioselective bromination in the 2 and 5 positions.

1,4-Dibromo (pseudo)halogen compounds are obtainable, for example, from the corresponding dibromides by replacement with, for example, cyano groups (M. Rehahn, A.-D. Schluter, W. J. Feast, Synthesis 386, 1988).

Correspondingly, numerous ways of synthesizing oligo-p-phenylene and stilbene derivatives can also be employed.

Oligo-p-phenylenes can, for example, be built up from the corresponding monomers by the abovementioned methods.

Stilbene derivatives can be synthesized, for example, by the methods described in Houben-Weyl, Methoden der Organischen Chemie, Georg-Thieme-Verlag, Stuttgart (e.g. Wittig reaction, Knoevenagel reaction, Heck reaction).

Preference is given to a synthetic route which is shown in Scheme 1 for the example of the particularly preferred bisalkoxy-substituted 1,4-dibromobenzenes.

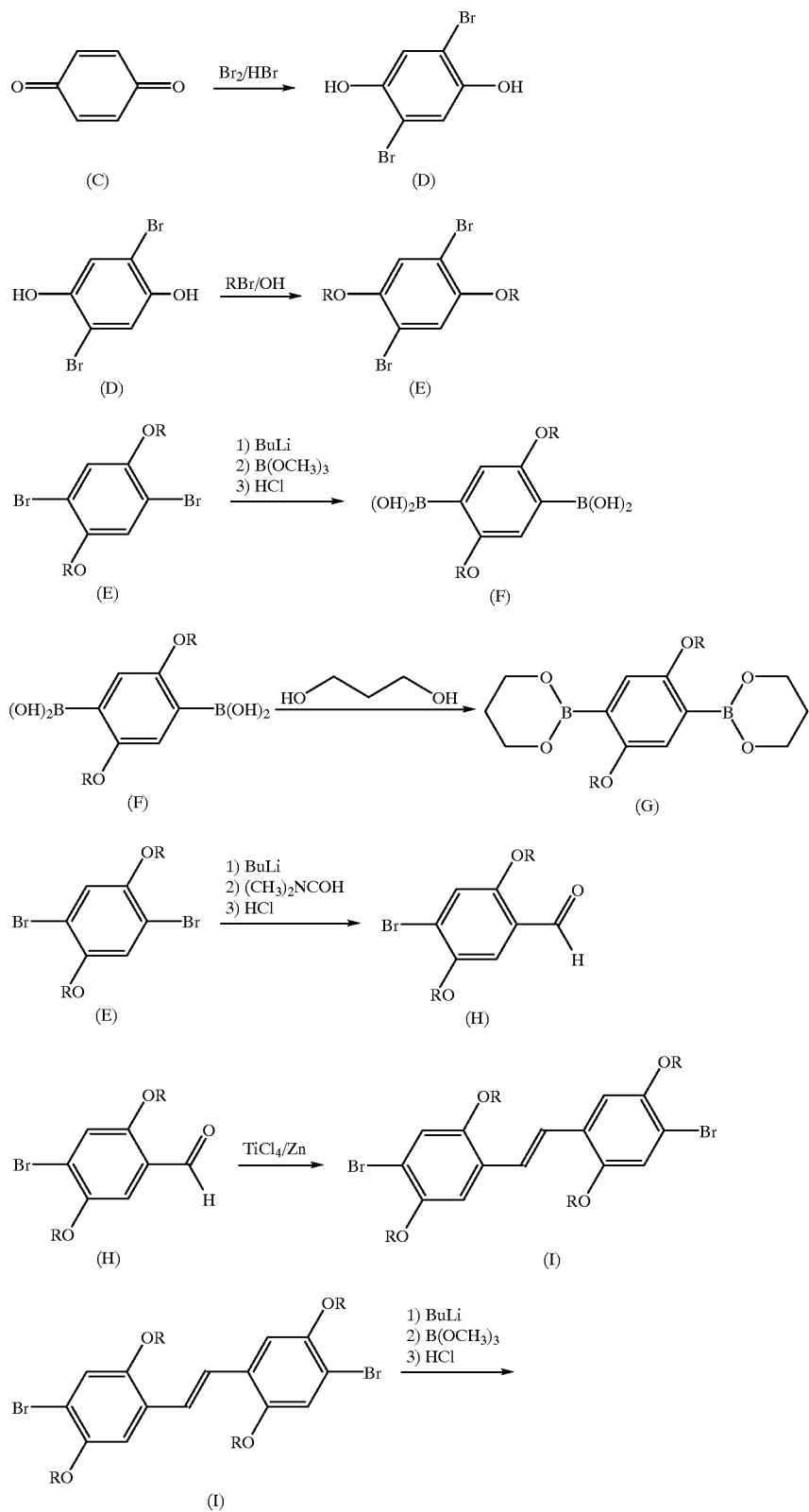

-continued

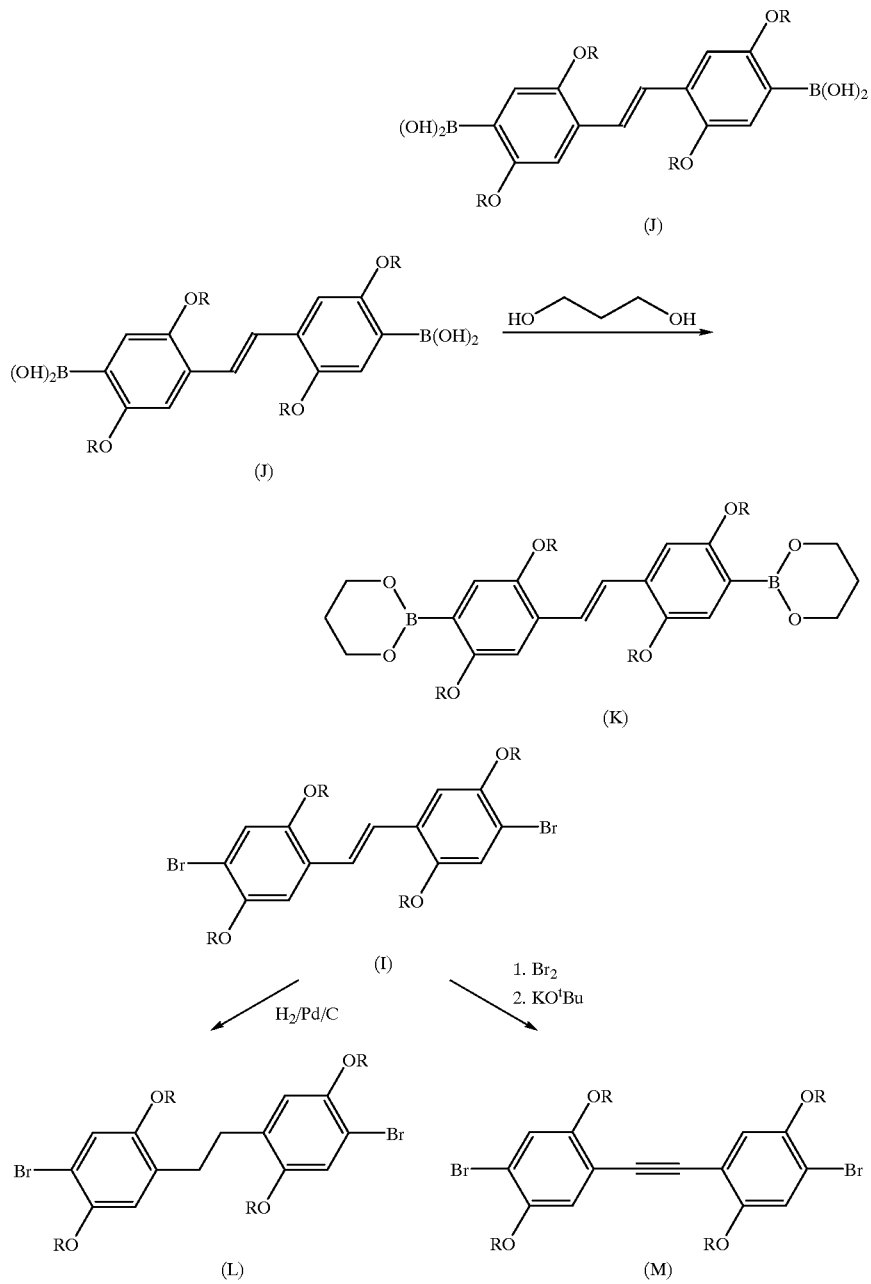

According to Scheme 1, p-benzoquinone (C) is reacted reductively in aqueous HBr solution with Br₂ to give the dibromohydroquinone (D) and etherified with appropriate alkyl bromides to give (E). In order to obtain compounds having alkyl substituents in place of the alkoxy substituents obtained in this way, 1,4-dichlorobenzene can be reacted in a Grignard reaction to give a 1,4-dialkylated aromatic which is converted by subsequent regioselective bromination into a dibromide analogous to (E). These products can be esterified with trimethyl borate after replacement of the halogen by a metal and saponified to give the corresponding diboronic acid (F). This is subsequently esterified again using 1,3-propanediol to give the cyclic diester (G).

Starting from the dibromide (E), the stilbene derivative monomer is also obtainable. For this purpose, formylation is first carried out in a Bouveault reaction and the resulting benzaldehyde derivative (H) is coupled in a McMurry reaction to give the dibromostilbene derivative (I). Boration of this gives (J) and esterification of the latter in turn gives the cyclic diboronic ester (K).

Likewise, the dibromostilbene derivative (I) can be converted by hydrogenation, for example using $H_2$/Pd/C, or elimination, for example by bromination and subsequent reaction with a strong base such as KO$_t$Bu, into 1,2-diphenylethanes (L) (Y=—CHR$^{11}$—CHR$^{12}$—) or tolanes (M) (Y=—C≡C—), The monomeric species prepared by this process are very suitable as starting materials for preparing the polymers of the invention.

The dibromides (E) and (I) can just as well be reacted by known literature methods to give, for example, distannanes (J. K. Stille, Angew. Chem. Int. Ed. Engl. 1986, 25, 508)

which can likewise be starting compounds for the polymers of the invention.

The invention further provides for the use of the polymers of the invention as electroluminescence materials, i.e. as an active layer in an electroluminescence device. Active layers for the purposes of the invention are electroluminescence materials which are capable of emitting light on application of an electric field (light-emitting layer) or materials which improve the injection and/or transport of the positive and/or negative charges (charge injection layers and charge transport layers).

The invention therefore also provides an electroluminescence material comprising or preferably consisting essentially of one or more, preferably one, polymer(s) according to the invention.

This electroluminescence material is preferably a light-emitting material, a charge transport material, in particular an electron or hole transport material, or a charge injection material, in particular an electron or hole injection material.

The invention further provides an electroluminescence device comprising one or more active layers, where at least one of these active layers comprises at least one polymer according to the invention. The active layer can be, for example, a light-emitting layer and/or a transport layer and/or a charge injection layer.

The general structure of such electroluminescence devices is described, for example, in U.S. Pat. No. 4,539,507 and U.S. Pat. No. 5,151,629. Polymer-containing electroluminescence devices are described, for example, in WO 90/13148 and EP-A 0 443861.

They usually comprise one or more electroluminescent layers between a cathode and an anode, with at least one of the electrodes being transparent. In addition, one or more electron injection and/or electron transport layers can be introduced between the electroluminescent layer(s) and the cathode and/or one or more hole injection and/or hole transport layers can be introduced between the electroluminescent layer(s) and the anode. As cathode, use can be made of various metals, e.g. Ca, Mg, Al, Mg/Al. As anode, use can be made of metals or compounds, e.g. Au or ITO (indium oxide/tin oxide), on a transparent substrate, e.g. of glass or a transparent polymer.

In operation, the cathode is placed at a negative potential relative to the anode. Electrons from the cathode are thus injected into an electron injection layer/electron transport layer or directly into a light-emitting layer. At the same time, holes from the anode are injected into a hole injection layer/hole transport layer or directly into a light-emitting layer.

The injected charge carriers move through the active layers toward one another under the action of the applied potential. This leads, at the interface between charge transport layer and light-emitting layer or within the light-emitting layer, to electron-hole pairs which recombine with emission of light.

The color of the emitted light can be varied by means of the compound used as light-emitting layer.

Electroluminescence devices are employed, for example, as self-illuminating display elements such as control lamps, alphanumeric displays, signs, and in optoelectronic couplers.

The literature references mentioned in the description are hereby incorporated by reference into the description.

The invention is illustrated below by means of examples, without being restricted thereby.

EXAMPLE 1

Poly(2,2',2",5,5',5"-hexa(i-pentyloxy)-p-terphenyl-4,4'-ylene-vinylene)

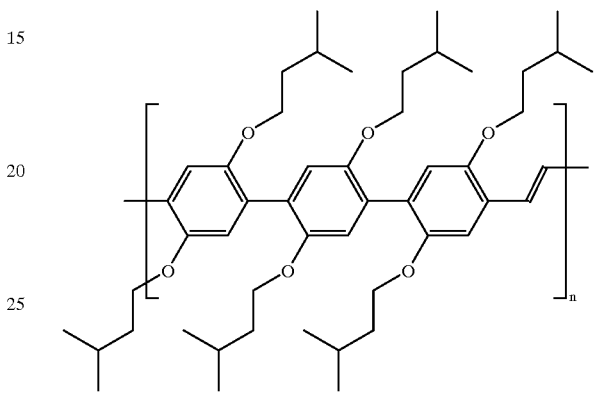

Empirical formula: $C_{50}H_{74}O_6$

Molecular weight of the repeating unit: 770 g/mol

Melting point: 210° C.

Description of the synthesis 1.142 g (1.67 mmol) of 4,4'-dibromo-2,2',5,5'-tetraisopentyloxy-trans-stilbene, 0.700 g (1.67 mmol) of the 1,3-propane diol diester of 2,5-diisopentyloxy-1,4-benzenediboronic acid and 2.11 g (20 mmol) of sodium hydrogen carbonate are weighed into a Schlenk flask, the latter is connected to a high-efficiency cooler and the apparatus is placed under protective gas by evacuating ($10^{-1}$ mbar) three times and each time carefully introducing argon. In a countercurrent of argon, 20 ml of absolute tetrahydrofuran and 20 ml of degassed (nitrogen stream for three hours at 80° C.), deionized water are then injected. After all solid constituents have been dissolved by stirring, a solution of 20 mg ($1.5 \times 10^{-5}$ mol) of palladium catalyst (Pd(PPh$_3$)$_4$) in a little absolute tetrahydrofuran are injected and the reaction mixture is heated at 80° C. for 72 hours while stirring very vigorously. To protect the light-sensitive catalyst, direct exposure to light should be avoided during this time.

After cooling to room temperature, the mixture is poured under argon into methanol (volume ratio=1:5). The precipitate is filtered off, washed with water, taken up in chloroform and filtered again. The filtrate is evaporated, taken up in benzene and after filtration through a 0.2 μm filter (Millipore) is freeze dried.

EXAMPLE 2

Poly(2,2',5,5'-tetra(i-pentyloxy)-p-biphenyl-ylene-vinylene)

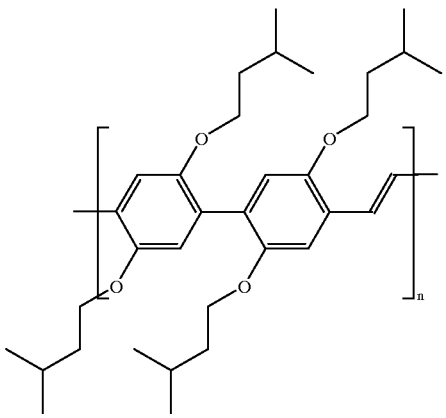

Empirical formula: $C_{34}H_{50}O_4$

Molecular weight of the repeating unit: 522 g/mol

Melting point: 220° C.

Description of the synthesis 413.0 mg (0.6 mmol) of 4,4'-dibromo-2,2',5,5'-tetraisopentyloxy-trans-stilbene, 418.6 mg (0.6 mmol) of the propyl ester of 2,2',5,5'-tetraisopentyloxy4,4'-trans-stilbenediboronic acid and 1.05 g (10 mmol) of sodium hydrogen carbonate are weighed into a Schlenk flask, the latter is connected to a high-efficiency cooler and the apparatus is placed under protective gas by evacuating ($10^{-1}$ mbar) three times and each time carefully introducing argon. In a countercurrent of argon, 10 ml of absolute tetrahydrofuran and 10 ml of degassed, deionized water are then injected. After all solid constituents have been dissolved by stirring, a solution of 7.2 mg ($6.2 \times 10^{-6}$ mol) of palladium catalyst ($Pd(PPh_3)_4$) in a little absolute tetrahydrofuran is injected and the reaction mixture is heated at 80° C. for 72 hours while stirring very vigorously. To protect the light-sensitive catalyst, direct exposure to light should be avoided during this time.

After cooling to room temperature, the mixture is poured under argon into methanol (volume ratio=1:5). The precipitate is filtered off, washed with water, taken up in chloroform and filtered again. The filtrate is evaporated, taken up in benzene and after filtration through a 0.2 µm filter (Millipore) is freeze dried.

EXAMPLE 3

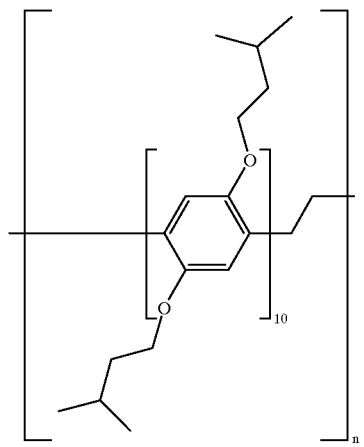

Empirical formula: $C_{162}H_{244}O_{20}$

Molecular weight of the repeating unit: 2508 g/mol

Melting point: 170° C.

Description of the synthesis:

0.3902 g (0.952 mmol) of 1,4-dibromo-2,5-diisopentoxybenzene, 0.1638 g (0.239 mmol) of 1,2-di(4-bromo-2,5-diisopentoxyphenyl)ethane, 0.51 g (1.220 mmol) of the propanediol diester of 1,4-diisopentoxy-2,5-phenyldiboronic acid and 1.26 g of sodium hydrogen carbonate are weighed into a Schlenk flask, the latter is connected to a high-efficiency cooler and the apparatus is placed under protective gas by evacuating ($10^{-1}$ mbar) three times and each time carefully introducing argon. In a countercurrent of argon, 10 ml of absolute tetrahydrofuran and 10 ml of degassed, deionized water are then injected. After all solid constituents have been dissolved by stirring, a solution of 15 mg ($1.3 \times 10^{-5}$ mol) of palladium catalyst ($Pd(PPh_3)_4$) in a little absolute tetrahydrofuran is injected and the reaction mixture is heated at 80° C. for 72 hours while stirring very vigorously. To protect the light-sensitive catalyst, direct exposure to light should be avoided during this time.

After cooling to room temperature, the mixture is poured under argon into methanol (volume ratio=1:5). The precipitate is filtered off, washed with water, taken up in chloroform and filtered again. The filtrate is evaporated, taken up in benzene and after filtration through a 0.2 µm filter (Millipore) is freeze dried.

EXAMPLE 4

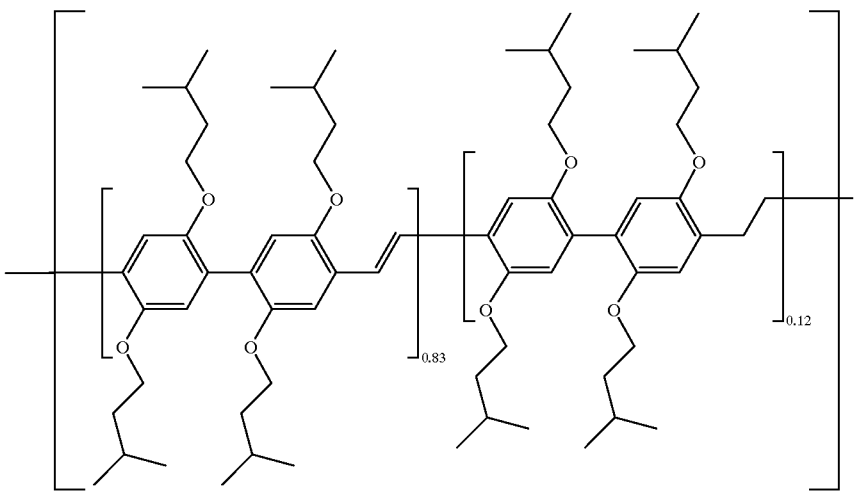

Empirical formula: $C_{204}H_{302}O_{24}$
Molecular weight of the repeating unit: 3134 g/mol
Melting point: 210° C.
Description of the synthesis:

0.2991 g (0.484 mmol) of 4,4'-dibromo-2,2',5,5'-tetraisopentoxy-trans-stilbene, 0.200 g (0.292 mmol) of 1,2-di(4-bromo-2,5-diisopentoxyphenyl)ethane, 0.4958 g (0.716 mmol) of the propyl ester of 2,2',5,5'-tetraisopentoxy-4,4'-trans-stilbenediboronic acid and 0.84 g of sodium hydrogen carbonate are weighed into a Schlenk flask, the latter is connected to a high-efficiency cooler and the apparatus is placed under protective gas by evacuating ($10^{-1}$ mbar) three times and each time carefully introducing argon. In a countercurrent of argon, 10 ml of absolute tetrahydrofuran and 10 ml of degassed, deionized water are then injected. After all solid constituents have been dissolved by stirring, a solution of 10 mg ($0.9\times 10^{-5}$ mol) of palladium catalyst (Pd(PPh$_3$)$_4$) in a little absolute tetrahydrofuran is injected and the reaction mixture is heated at 80° C. for 72 hours while stirring very vigorously. To protect the light-sensitive catalyst, direct exposure to light should be avoided during this time.

After cooling to room temperature, the mixture is poured under argon into methanol (volume ratio=1:5). The precipitate is filtered off, washed with water, taken up in chloroform and filtered again. The filtrate is evaporated, taken up in benzene and after filtration through a 0.2 μm filter (Millipore) is freeze dried.

EXAMPLE 5

Use as electroluminescence material

A quartz glass support is first rubbed down with acetone, precleaned for 15 minutes in methylene chloride in an ultrasonic bath, treated for 30 minutes in a reaction solution consisting of 10% of hydrogen peroxide (30% strength), 40% of aqueous concentrated ammonia solution and 50% of milli-Q water (deionized water having a conductivity of 0.5 μS/cm) and subsequently washed for 10 minutes in a stream of milli-Q water. The glass support cleaned in this way is treated in an argon plasma at 1 mbar for 5 minutes and subsequently hydrophobicized for 30 minutes in a 30% strength solution of hexamethyldisilazane in chloroform. 2 mm wide strips of first chromium (4 nm) and subsequently gold (17 nm) are vapor-deposited onto the support at $2\times 10^{-5}$ mbar.

The polymer film is applied by spin coating. For this purpose, a few drops of a 3% strength polymer solution (polymer from Example 1) in toluene are placed on the glass support and the latter is rotated at 2000 rpm for 1 minute. After drying the substrate, the 100 nm thick homogeneous polymer film can be further processed.

Subsequently, at $2\times 10^{-5}$ mbar, Al is applied by vapor-deposition in 2 mm wide strips perpendicular to the gold coating. The resulting device Au/polymer/Al is placed in a specimen holder and the electrodes are connected to a source of electric power with the Au strips being given a positive polarity and the Al strips a negative polarity. On application of a field of $15\times 10^7$ V/m, an intense, homogeneous, blue fluorescence from the corresponding matrix element is observed. The electroluminescence spectrum corresponds essentially to the photoluminescence spectrum. The external quantum yield is in the region of 0.1%.

EXAMPLE 6

A glass support coated with a 2 mm wide strip of transparent, conductive indium tin oxide (ITO) is cleaned by rubbing with acetone and treatment with ultrasound in methylene chloride for 15 minutes.

The following layers, each having a thickness of 100 mm [sic], are applied in succession by spin coating:
  poly(vinylcarbazole) (PVK) in chloroform
  the polymer from Example 3 in toluene
  2-(4-biphenylyl)-5-(4-tert-butylphenyl)-[1,3,4] oxadiazole (PBD), 25% in polystyrene, in acetone.

Subsequently, at $2\times 10^5$ [sic] mbar, ca. [sic] is applied by vapor deposition in 1 mm wide strips perpendicular to the ITO strip. The resulting device glass/ITO/PVK/polymer/PBD in PS/Ca is placed in a specimen holder under an argon atmosphere and the electrodes are connected to a source of electric power with the ITO strips [sic] being given a positive polarity and the Ca strips a negative polarity. On application of a potential of 16 V, an intense, homogeneous, blue fluorescence from the corresponding matrix element is observed. The electroluminescence spectrum corresponds essentially to the photoluminescence spectrum. The internal quantum yield is in the region of 1.0%.

We claim:

1. A polymer which comprises oligo-p-phenylene units and comprises at least one structural element of the formula $(A_kB)_n$, where the symbols and indices have the following meanings:

A are identical or different units

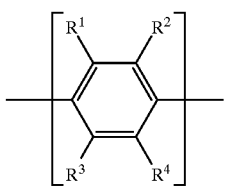

B are identical or different units

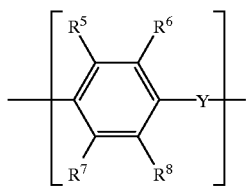

Y are identical or different and are each (E)—CR$^9$=CR$^{10}$—, —C≡C— or —CHR$^{11}$—CHR$^{12}$, wherein (E) is

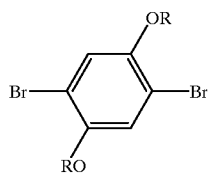

R$^1$, R$^2$, R$^3$, R$^4$, R$^5$, R$^6$, R$^7$, R$^8$, R$^9$, R$^{10}$, R$^{11}$, R$^{12}$ are, independently of one another, identical or different in the individual structural elements and are each H, a straight-chain or branched alkyl group having from 1 to 22 carbon atoms, or an aryl or aryloxy group, or Br, Cl, F, CN or alkyloxycarbonyl having from 2 to 23 carbon atoms;

k is from 1 to 25;

n is from 1 to 200.

2. A polymer as claimed in claim 1 which comprises not only at least one structural element of the formula $(A_kB)_n$ but also a structural element of the formula (VII),

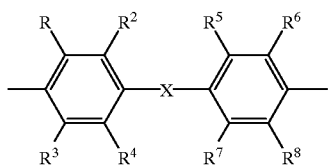

(VII)

where R$^1$ to R$^8$ have the meanings given for the structural element $(A_kB)_n$ and X is a saturated hydrogen chain —(CH$_2$)$_n$— where n=1–10.

3. A process for preparing a polymer as claimed in claim 1 which comprises reacting a compound of the formula (I)

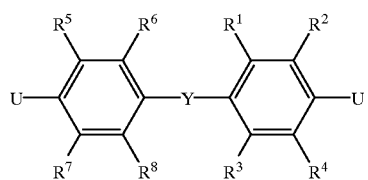

(I)

with a compound of the formula (II) and/or (III)

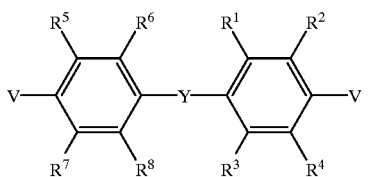

(II)

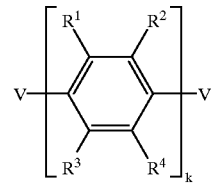

(III)

in an inert organic solvent or solvent mixture in the presence of at least one palladium-containing compound, where U and V are different from one another and are each a halogen selected from the group consisting of I, Br and Cl or BQ$_1$Q$_2$, wherein Q$_1$, Q$_2$ are identical or different and are —OH, C$_1$–C$_{10}$-alkoxy, C$_1$–C$_{10}$-alkyl, phenyl or halogen or Q$_1$ and Q$_2$ together form a C$_1$–C$_4$-alkylenedioxy group, a methylene group or Q$_1$ and Q$_2$ and the boron atom are together part of a boroxane ring of the formula (IV)

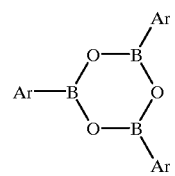

(IV)

Ar is an aromatic radical of the formula (I), (II) or (III);

Y are identical or different and are each (E)—CR$^9$=CR$^{10}$—, —C≡C— or —CHR$^{11}$—CHR$^{12}$;

R$^1$, R$^2$, R$^3$, R$^4$, R$^5$, R$^6$, R$^7$, R$^8$, R$^9$, R$^{10}$, R$^{11}$, R$^{12}$ are, independently of one another, identical or different in the individual structural elements and are each H, a straight-chain or branched alkyl group having from 1 to 22 carbon atoms, or an aryl or aryloxy group, or Br, Cl, F, CN, NO$_2$ or alkyloxycarbonyl having from 2 to 23 carbon atoms, k is from 1 to 25.

4. A polymer as claimed in claim 1, wherein Y is —CR$^9$=CR$^{10}$—.

5. A polymer as claimed in claim 1, wherein, in the formulae (A) and (B) R$^2$, R$^3$, R$^6$, R$^7$, R$^9$, R$^{10}$, R$^{11}$ and R$^{12}$ are hydrogen.

6. A polymer as claimed in claim 1, wherein, in the formulae (A) and (B), $R^1$, $R^4$, $R^5$ and $R^8$ are identical or different and are each a straight-chain or branched alkyl or alkoxy group having from 1 to 22 carbon atoms.

7. A polymer as claimed in claim 1 consisting of structural elements of the formula $(A_kB)_n$.

8. A polymer as claimed in claim 7 which is a homopolymer, a random copolymer or a block copolymer.

9. A polymer as claimed in claim 1 which comprises not only at least one structural element of the formula $(A_kB)_n$ but also a structural element of the formula (VIII)

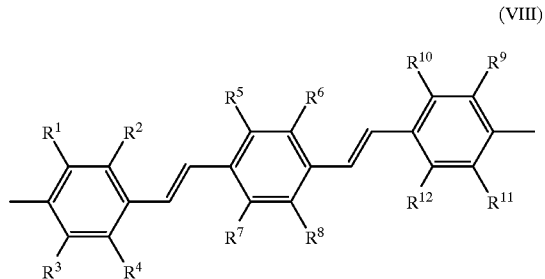

(VIII)

where $R^1$ to $R^4$ have the meanings given for the structural element $(A_kB)_n$.

10. An electroluminescence material comprising one the polymer as claimed in claim 7.

11. An electroluminescence device comprising an active layer wherein at least one of these active layers comprises the polymer as claimed in claim 1.

12. The polymer as claimed in claim 1, wherein k is 2 or 3.

13. The polymer as claimed in claim 3, wherein k is 2 or 3.

14. The polymer as claimed in claim 1, wherein a non-adjacent $CH_2$ group of the straight chain or branched alky group is replaced by —O—, —S—, —$SO_2$—, —COOC—, —OOC— or phenylene.

15. The polymer as claimed in claim 1, wherein the aromatic unit in the aryl or aryloxy group is substituted by $C_1$–$C_{22}$-alkyl, $C_1$–$C_{22}$-alkoxy, Br, Cl, F or CN.

16. The polymer as claimed in claim 2, wherein a non-adjacent $CH_2$ group of the straight chain or branched alkyl group is replaced by —O—, —S—, —$SO_2$—, —COO—, —OOC— or phenylene.

17. The polymer as claimed in claim 3, wherein the U or V is Br, or $BQ_1Q_2$, and $Q_1$, $Q_2$ are identical or different and are —OH, $C_1$–$C_{10}$-alkoxy, $C_1$–$C_{10}$-alkyl, phenyl, or $Q_1$ and $Q_2$ together form a $C_1$–$C_4$-alkylenedioxy group, or a methylene group, or $Q_1$ and $Q_2$ and the boron atom are together part of a boroxane ring of the formula (IV)

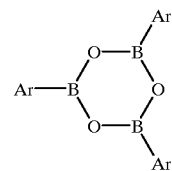

Ar is an aromatic radical of the formula (I), (II) or (III).

18. The polymer as claimed in claim 3, wherein a non-adjacent $CH_2$ group of the straight-chain or the branched alkyl group is replaced by —O—, —S—, —$SO_2$—, —COOC—, —OOC— or phenylene.

19. The polymer as claim in claim 3, wherein the aromatic unit in the aryl or aryloxy group is substituted by $C_1$–$C2_{22}$-alkyl, $C_1$–$C_{22}$-alkoxy, Br, Cl, F or CN.

* * * * *